C. S. HATTEN.
Churns.

No. 156,567.

Patented Nov. 3, 1874.

WITNESSES.
F. H. Schott
C. L. Evert

INVENTOR
Charles S. Hatten
By Alexander Mason
Attorneys.

UNITED STATES PATENT OFFICE.

CHARLES S. HATTEN, OF SIDNEY, IOWA.

IMPROVEMENT IN CHURNS.

Specification forming part of Letters Patent No. 156,567, dated November 3, 1874; application filed April 25, 1874.

*To all whom it may concern:*

Be it known that I, CHARLES S. HATTEN, of Sidney, in the county of Fremont and in the State of Iowa, have invented certain new and useful Improvements in Churns; and do hereby declare that the following is a full, clear, and exact description thereof, reference being had to the accompanying drawings and to the letters of reference marked thereon, making a part of this specification.

The nature of my invention consists in the construction and arrangement of a churn, as will be hereinafter more fully set forth.

In order to enable others skilled in the art to which my invention appertains to make and use the same, I will now proceed to describe its construction and operation, referring to the annexed drawing, in which—

Figure 1:
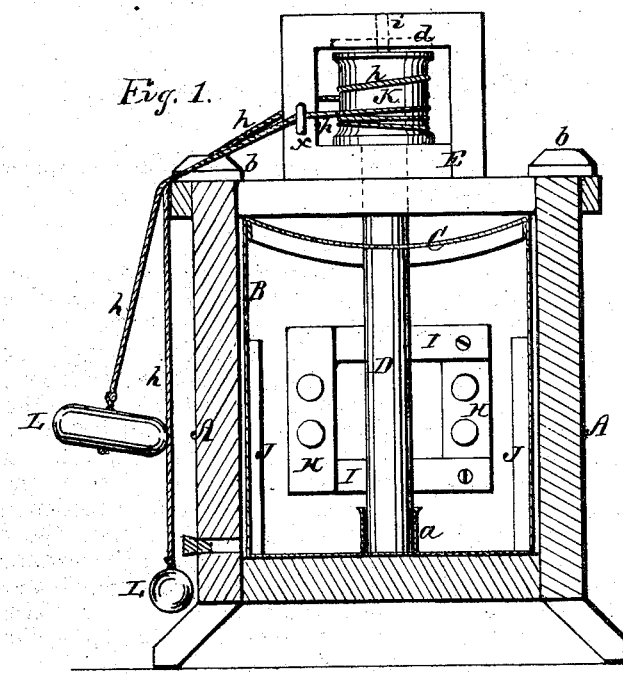
Figure 2:
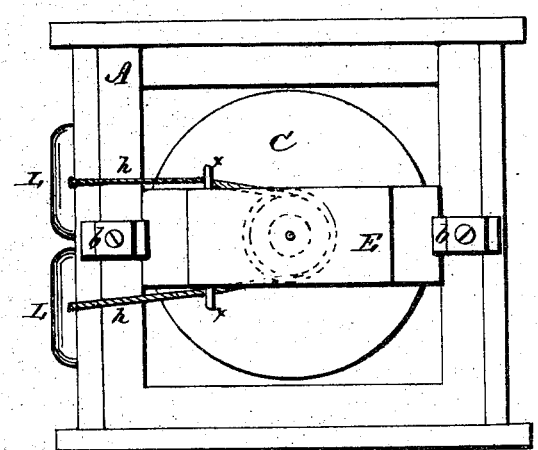

Figure 1 is a longitudinal vertical section of my churn, and Fig. 2 is a plan view of the same.

A represents an upright square box of any suitable dimensions, supported upon legs or otherwise, as desired. Within the box A is placed the cylindrical churn B, provided with a lid, C, which is concave on its upper side, as shown, so that any milk that might splash out around the central shaft will pass back into the churn. D is the central shaft, passing vertically through the cylindrical churn B, and its lower end resting in a thimble or socket, $a$, in the bottom of said churn. The upper end of the shaft D passes through a frame, E, held on top of the churn in the upper end of the box A by means of two buttons, $b\ b$. In the upper end of the shaft D is inserted a metal gudgeon, $i$, which has its bearing in a metal plate or bar, $d$, inserted in the upper part of the frame E. Through the shaft D, within the churn B, are mortised two horizontal arms, I I, and to these are secured perforated vertical dashers H H. On the sides of the interior of the churn B are vertical ribs J J. On the shaft D, within the frame E, is secured a drum, K, to which is fastened a cord, $h$. The ends of this cord are wound around the drum in opposite directions, and then passed through loops or eye-screws $x\ x$ fastened to the frame, and have handles L L attached to their ends.

The milk or cream being placed in the churn B, hot or cold water is poured in the box A around the churn to give the cream the right temperature. This water is drawn off through a hole or faucet at the bottom of the box. A rotary motion, first in one direction and then in the opposite direction, is produced by pulling alternately upon the cords $h\ h$, whereby the globules in the cream are rapidly broken by the dashers H H and the cleats J J.

By turning the buttons $a\ a$ the frame E, with the dasher and lid of the churn, can be easily removed.

My invention is especially applicable to dairymen and others who have large quantities of milk.

It will be seen and understood that the exterior frame acts as a support to hold and steady the interior can, which contains the milk. After the butter is made in one can it is taken out and another filled can is put in its place in the frame A.

The frame E, having the operative mechanism and the dasher-shaft with dashers, is removable from the box or can B, and from the frame A, so that it is easily taken away for cleansing of the dashers and to allow the removal of one can and substitution thereof of another.

Having thus fully described my invention, what I claim as new, and desire to secure by Letters Patent, is—

The combination of the stationary box or frame A and the removable frame E with the operative mechanism and dasher-shaft and dashers, and the interior removable milk-can B, all substantially as set forth.

In testimony that I claim the foregoing I have hereunto set my hand this 4th day of March, 1874.

CHARLES S. HATTEN.

Witnesses:
H. F. GAGNEBIN,
HENRY BOWEN.